United States Patent
Bailleul

(10) Patent No.: US 6,895,053 B1
(45) Date of Patent: May 17, 2005

(54) MODIFYING CODED DATA

(75) Inventor: Nicolas Bailleul, Paris (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 759 days.

(21) Appl. No.: 09/400,960

(22) Filed: Sep. 22, 1999

(30) Foreign Application Priority Data

Sep. 29, 1998 (EP) .......................................... 98402394
Oct. 30, 1998 (EP) .......................................... 98402728

(51) Int. Cl.[7] .............................................. H04N 7/12
(52) U.S. Cl. ............................................. 375/240.12
(58) Field of Search ........................... 348/387.1, 533; 375/240, 240.1, 240.12, 240.24, 240.27; 382/232, 236, 248, 246

(56) References Cited

U.S. PATENT DOCUMENTS

| 5,278,871 A | * | 1/1994 | Rasky et al. ................... 375/99 |
| 5,446,747 A | * | 8/1995 | Berrou ......................... 371/45 |
| 6,011,587 A | * | 1/2000 | Sakazawa et al. ........... 348/387 |
| 6,148,030 A | * | 11/2000 | Katata et al. ............. 375/240.1 |

FOREIGN PATENT DOCUMENTS

| GB | 2316568 | 2/1998 | ............ H04N/7/01 |
| WO | WO 98/34408 | * 6/1998 | ................. 348/684 |
| WO | WO9943162 | 8/1999 | ............ H04N/7/26 |

* cited by examiner

Primary Examiner—Chris Kelley
Assistant Examiner—Behrooz Senfi

(57) ABSTRACT

By coding (ENC1) data (D), coded data (CD) and, in addition, a set of parameters (PAR) for decoding (DEC1) the coded data (CD) are obtained. MPEG video coding is an example of such a coding. The coded data (CD) is modified by carrying out the following steps. The coded data (CD) is, at least partially, decoded (DEC1) so as to obtain decoded data (DD). The decoded data (DD) is modified (MOD) so as to obtain modified data (MD). The modified data (MD) is coded (ENC) so as to obtain coded modified data (CMD).

It is examined (EXAM) whether a satisfactory result will be obtained if the set of parameters (PAR) for decoding the coded data (CD) is applied for decoding (DEC2) the coded modified data (CMD). If the result is satisfactory, the set of parameters (PAR) for decoding the coded data (CD) is added to the coded modified data (CMD). If the result is not satisfactory, a new set of parameters (PAR) is established (ADP) and the new set of parameters (APAR) is added to the coded modified data (CMD). Accordingly, the coded data (CD) can be modified with relatively little distortion. An example of a modification which can be carried out in this manner is a 422/420 format conversion of MPEG-coded video.

2 Claims, 4 Drawing Sheets o = CS

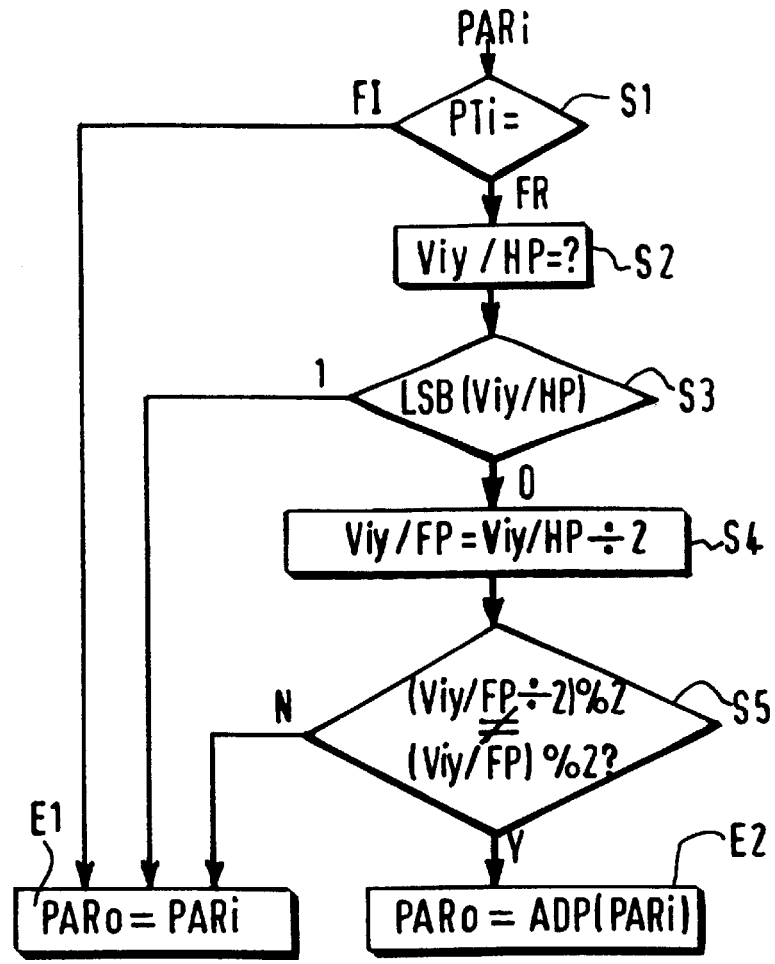

MODIFYING CODED DATA

The invention relates to modifying coded data which is accompanied by a set of parameters for decoding the coded data. The invention may be applied, for example, to carry out a format conversion on a sequence of pictures which has been coded in accordance with a standard defined by the Moving Pictures Experts Group (MPEG).

Document ISO/IEC 13818-2 relates to the MPEG-2 standard. Section 6.1.1.2 defines that a frame consists of three rectangular matrices of integers: one luminance matrix (Y) and two chrominance matrices (Cb and Cr). Section 6.1.1.8 describes the 4:2:0 format which will hereinafter be referred to as the 420 format. In this format, the Cb and Cr matrices shall be half the size of the Y-matrix in both the horizontal and the vertical dimension. Section 6.1.1.9 describes the 4:2:2 format, which will hereinafter be referred to as the 422 format. In this format, the Cb and Cr matrices shall be half the size of the Y-matrix in the horizontal dimension and the same size as the Y-matrix in the vertical dimension.

Section 7.6.3.7 describes motion vectors for the chrominance components. For the 420 format, both the horizontal and vertical components of the motion vector are scaled by dividing by two. For the 422 format, the horizontal component of the motion vector is scaled by dividing by two, while the vertical component is not altered.

It is an object of the invention to modify coded data with relatively little distortion.

The invention takes the following aspects into consideration. MPEG video coding is an example of a data-coding technique which has the following property. By coding data (a macroblock), coded data (a coded macroblock) and, in addition, a set of parameters for decoding the coded data are obtained (motion vectors, prediction modes, etc.). The data, which is available in a coded form, can be modified by carrying out the following steps. The coded data is decoded, at least partially, so as to obtain decoded data. The decoded data is modified so as to obtain modified data. The modified data is coded so as to obtain coded modified data.

Basically, there are two different approaches to obtaining a set of parameters for the coded modified data. One approach is to generate a new set of parameters, for example, by coding the modified data independently of the set of parameters which was established for the coded data. A disadvantage of this approach is that it may introduce new coding errors and thus additional distortion. For example, if this approach is used for modifying MPEG-coded video data, new motion vectors will be generated which may introduce additional picture-prediction errors.

The other approach is to re-use the set of parameters, which has been established for the coded data, for the coded modified data. This implies that, for decoding the coded modified data, the set of parameters which was originally established for the coded data will be used. This may not always be the best option in terms of distortion.

For example, let it be assumed that a 422/420 format conversion is carried out on MPEG-coded video data. Let it further be assumed that motion vectors and prediction modes, which apply to the 422 format, are re-used for the 420 format. In the 420 format, the vertical component of a motion vector is divided by two and rounded off to the nearest integer for the purpose of motion compensation for chrominance samples, whereas, in the 422 format, the vertical component as such is used. If a motion vector and other parameters for the 422 format are re-used for the 420 format, the following effect may occur. For a group of chrominance samples on a line, the motion vector refers to chrominance samples on an even line in the 422 format, whereas, in the 420 format, it refers to chrominance samples on an add line, or vice versa. For interlaced pictures with frame prediction, such a change in line parity will cause temporal errors in a picture prediction at a decoding end. It will thus introduce distortion in decoded video data.

According to the invention, the following steps are carried out in addition to the steps of decoding, modifying and coding, discussed hereinbefore. It is examined whether a satisfactory result will be obtained if the set of parameters for decoding the coded data is applied for decoding the coded modified data. If the result is satisfactory, the set of parameters for decoding the coded data is added to the coded modified data. If the result is not satisfactory, a new set of parameters is established and the new set of parameters is added to the coded modified data.

Accordingly, in the invention, a choice is made between re-using the set of parameters which has been established for the coded data, and establishing a new set of parameters for the coded modified data, rather than always applying one approach. The choice is made on the basis that, at a decoding end which receives the coded modified data, a satisfactory result should be obtained. Thus, the invention allows modification of coded data with relatively little distortion.

The invention may be applied, for example, for carrying out a 422/420 format conversion on MPEG-coded video data. In such an application, the following parameters may be examined: the prediction mode, which may be frame or field, and the motion vector. It is examined whether the prediction mode is frame, and whether the parity of the motion vector's vertical component changes when divided by two. If so, there would be a line-parity change as described hereinbefore. Consequently, there would be distortion at a decoding end if the set of parameters for the 422 format were re-used for the 420 format. To prevent such distortion at a decoding end, some parameters are adapted. The prediction mode is changed from frame to field. As a result, there will be a separate picture prediction for a field with even lines and a field with add lines. The motion vector is, in effect, split into two motion vectors: one motion vector for each field. Furthermore, the parameter motion_vertical_field_select, which is defined in section 6.3.17.2 of the MPEG-2 standard, is given an appropriate value, such that each motion vector refers to the correct field.

The invention and additional features, which may be optionally used to implement the invention to advantage, are apparent from and will be elucidated with reference to the drawings described hereinafter.

FIG. 1 is a conceptual diagram illustrating basic features of the invention as claimed in claim 1;

FIGS. 2a and 2b are conceptual diagrams illustrating an interlaced picture in the 422 format and in the 420 format, respectively;

FIG. 6 is a flow-chart illustrating a method in accordance with which the 422/420 format converter illustrated in FIG. 4 may operate; and FIG. 7 is a table illustrating a parameter adaptation being part of the method illustrated in FIG. 6.

First, some remarks will be made on the use of reference signs. Similar entities are denoted by an identical letter code throughout the drawings. In a single drawing, various similar entities may be shown. In that case, a numeral is added to the letter code, to distinguish similar entities from each other. The numeral will be between parentheses if the number of similar entities is a running parameter. In the description and the claims, any numeral in a reference sign may be omitted if this is appropriate.

Figure 1:
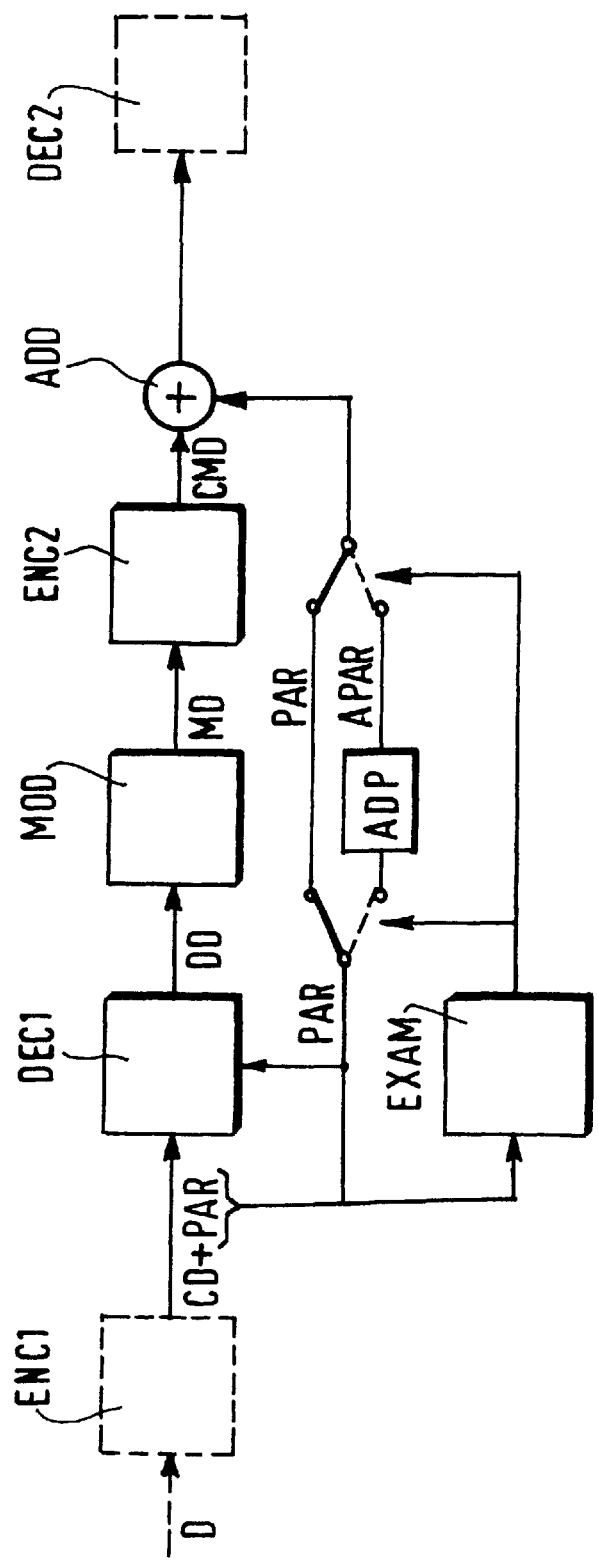

FIG. 1 illustrates basic features of the invention in solid lines. By coding ENC1 data D, coded data CD has been obtained and, in addition, a set of parameters PAR for decoding DEC1 the coded data CD. The coded data CD is modified by carrying out the following steps. The coded data CD is, at least partially, decoded DEC1 so as obtain decoded data DD. The decoded data DD is modified MOD so as to obtain modified data MD. The modified data MD is coded ENC so as to obtain coded modified data CMD.

It is examined EXAM whether a satisfactory result will be obtained if the set of parameters PAR for decoding the coded data CD is applied for decoding DEC2 the coded modified data CMD. If the result is satisfactory, the set of parameters PAR for decoding the coded data CD is added to the coded modified data CMD. If the result is not satisfactory, a new set of parameters APAR is established ADP. The new set of parameters APAR is added to the coded modified data CMD. The new set of parameters APAR may be established, for example, by adapting one or more parameters which were originally established for the coded data.

The features illustrated in FIG. 1 may be applied, for example, for carrying out a 422/420 format conversion of MPEG-coded video. In that case, the data D is formed by a sequence of pictures P. The coded data CD and the set of parameters PAR have been obtained by coding ENC1 the sequence of pictures P in accordance with an MPEG standard.

Figure 2A:
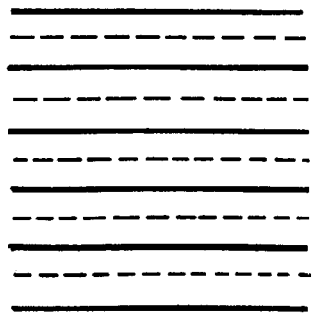
Figure 2B:
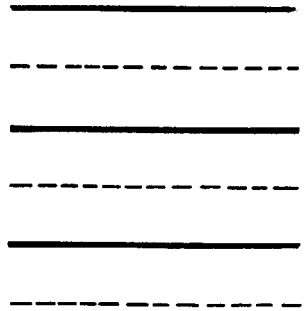

FIG. 2a illustrates an interlaced picture in the 422 format as defined in the MPEG-2 standard. FIG. 2b illustrates an interlaced picture in the 420 format. In FIGS. 2a and 2b, a solid line represents chrominance samples belonging to an odd line of a picture, and a broken line represents chrominance samples belonging to an even line. In the 422 format, there are twice as many chrominance samples in the vertical direction as in the 420 format.

Figure 3:
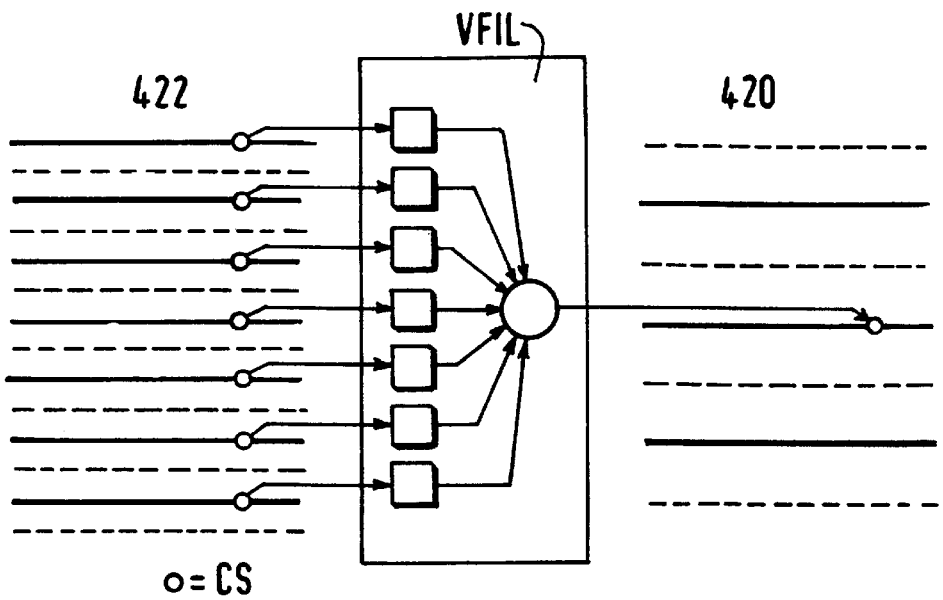
FIG. 3 is a conceptual diagram illustrating a 422/420 format conversion.

FIG. 3 illustrates a 422/420 format conversion. In FIG. 3, a small circle represents a chrominance sample CS. A vertical filter VFIL provides a chrominance sample for the 420 format by making a weighed combination of the best corresponding chrominance sample in the 422 format and other chrominance samples. These other chrominance samples have the same horizontal position as the best corresponding chrominance sample, but belong to neighboring lines having the same parity as the line to which the best corresponding chrominance sample belongs.

Figure 4:
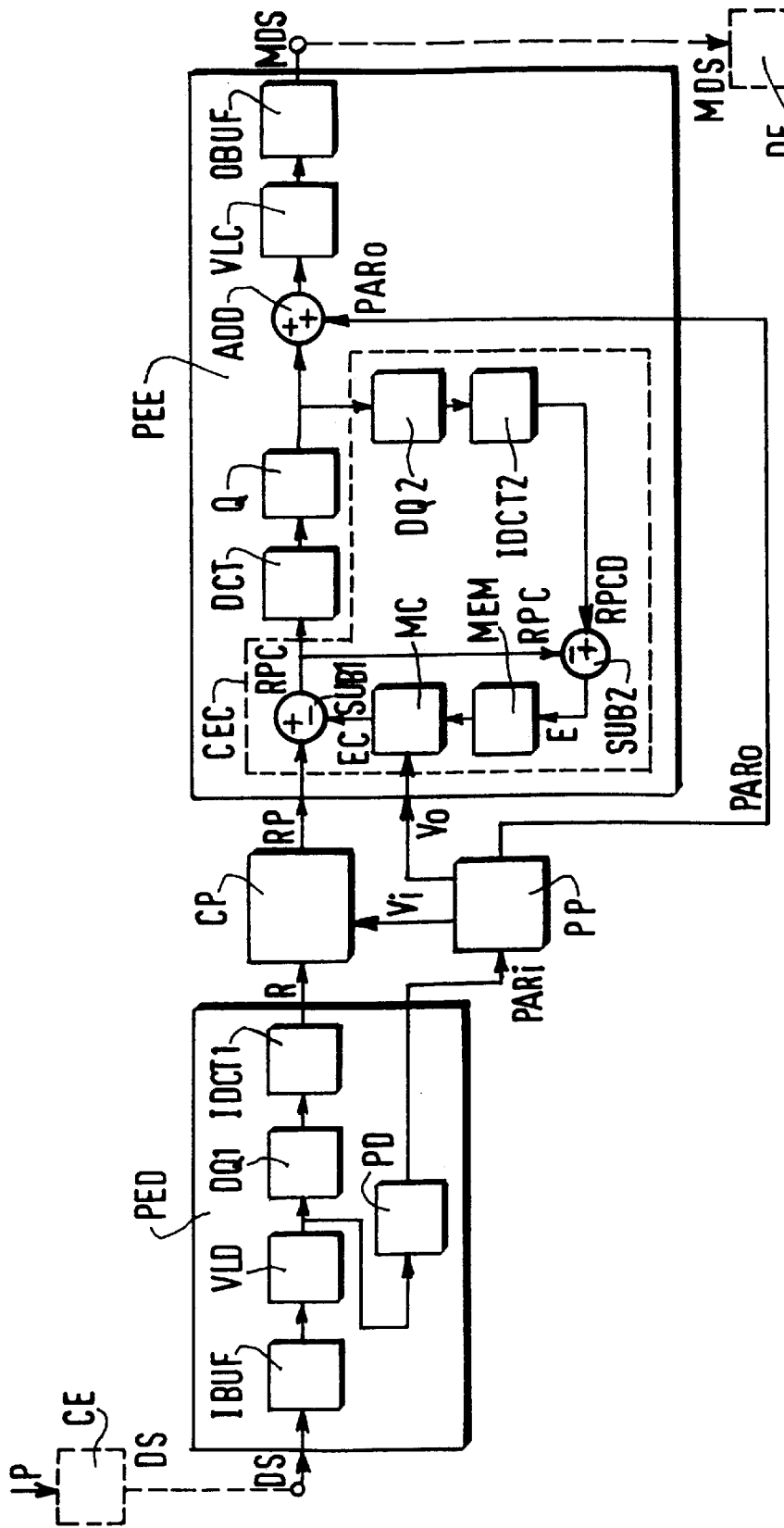
FIG. 4 is a block diagram illustrating a 422/420 format converter in accordance with the invention.

FIG. 4 illustrates a 422/420 format converter which recaptures the features illustrated in FIG. 1. The 422/420 format converter may be coupled between a coding end CE and a decoding end DE, both illustrated in broken lines. The coding end CE codes a sequence of pictures P in accordance with the 422 format of the MPEG-2 standard. As a result, an MPEG data stream DS is obtained. The 422/420 format converter provides a modified MPEG-data stream MDS in response to the data stream DS. The modified MPEG-data stream MDS represents the sequence of pictures P in accordance with the 420 format of the MPEG-2 standard. Thus, in effect, the 422/420 format converter modifies the sequence of pictures P at the coding end CE by reducing by two the chrominance resolution in the vertical dimension.

The 422/420 format converter shown in FIG. 4 comprises the following main functional blocks: a prediction-error decoder PED, a chrominance processor CP, a parameter processor PP, and a prediction-error encoder PEE. The prediction-error decoder PED comprises an input buffer IBUF, a variable-length decoder VLD, a de-quantizer DQ1 and an inverse discrete cosine transformer IDCT1. The prediction-error decoder DEC also comprises a parameter decoder PD. The prediction-error encoder PEE comprises a coding-error compensator CEC, a discrete-cosine transformer DCT, a quantizer Q, an adder ADD, a variable-length encoder VLC and an output buffer OBUF. The coding-error compensator CEC comprises a subtractor SUB1, a de-quantizer DQ2, an inverse discrete cosine transformer IDCT2, a subtractor SUB2, a memory MEM, and a motion compensator MC.

The 422/420 format converter illustrated in FIG. 4 basically operates as follows. The prediction-error decoder PED derives macroblocks of prediction-error samples R from the MPEG data stream DS received. Since the MPEG-data stream is in the 422 format, a macroblock comprises 4 blocks of luminance prediction-error samples and 2 blocks of chrominance prediction-error samples. The prediction-error decoder PED also derives a set of parameters PARi from the MPEG data stream DS. Some of the parameters PARi, for example motion-compensation parameters, apply to a specific macroblock of prediction-error samples R. Thus, a motion-compensation parameter which applies to one macroblock, may be different in value from a similar motion-compensation parameter which applies to another macroblock.

The chrominance processor CP processes the macroblocks of prediction-error samples R in accordance with the 422/420 conversion illustrated in FIG. 3. That is, it carries out a vertical filtering on chrominance samples for even and add lines separately. Accordingly, the chrominance processor CP provides processed macroblocks of prediction-error samples RP in accordance with the 420 format. Such a processed macroblock comprises 4 blocks of luminance prediction-error samples and 1 block of chrominance prediction-error samples.

The parameter processor PP provides a set of parameters PARo on the basis of the set of parameters PARi it receives from the prediction-error decoder PED. The parameter processor also calculates motion vectors Vi on the basis of the set of parameters PARi and motion vectors Vo on the basis of the set of parameters PARo. The motion vectors Vi constitute input data for the chrominance processor in addition to the blocks of prediction-error samples. The motion vectors Vo constitute input data for the prediction-error encoder PEE in addition to the processed blocks of prediction-error samples RP.

The prediction-error encoder PEE codes the processed blocks of prediction-error samples RP. Accordingly, the modified MPEG data stream MDS comprises the processed blocks of prediction-error samples RP in a coded form. In effect, the prediction-error encoder PEE also adds the set of parameters PARo to the modified data stream MDS.

First, the operation of the chrominance processor CP will be described in greater detail with reference to FIG. 5. Subsequently, the operation of the parameter processor PP will be described in greater detail with reference to FIGS. 6 and 7. Finally, the coding-error compensator CEC will be discussed in greater detail.

Figure 5:
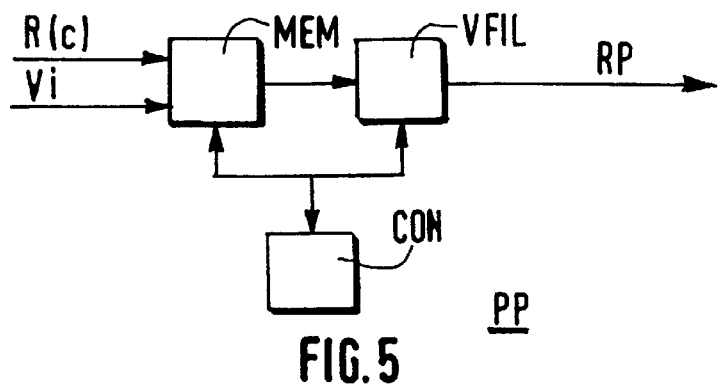
FIG. 5 is a block diagram illustrating a chrominance processor in the 422/420 format converter illustrated in FIG. 4.

FIG. 5 illustrates some details of the chrominance processor CP in the 422/420 converter illustrated in FIG. 4. The chrominance processor CP comprises a memory MEM, a vertical filter VFIL and a controller CON. The chrominance processor CP operates in the following manner. Blocks of chrominance prediction-error samples R(C) and the motion vectors Vi are written into the memory MEM, such that the vertical filter VFIL is able to gather chrominance prediction-error samples from different blocks which are each other's neighbors in the vertical direction, as well as the motion vectors belonging to these blocks. For a certain chrominance prediction-error sample, the controller CON checks if the block to which the chrominance prediction-error sample belongs, and the blocks which are upper neighbor and lower neighbor, respectively, have similar motion vectors Vi. If this is the case, the vertical filter VFIL uses these blocks to provide a chrominance prediction-error sample for the 420 format. If not, the vertical filter VFIL uses the block to which the chrominance prediction-error sample belongs only and, in effect, mirrors this block to simulate an upper neighbor and a lower neighbor providing filter input data.

FIG. 6 illustrates a method in accordance with which the parameter processor PP may operate so as to establish the set of parameters PARo. This method is based on the following recognition. In the 420 format, the vertical component of a motion vector is divided by two and rounded off to the nearest integer for the purpose of motion compensation for chrominance samples, whereas, in the 422 format, the vertical component as such is used. If a motion vector and other parameters for the 422 format are re-used for the 420 format, the following effect may occur. For a group of chrominance samples on a line, the motion vector refers to chrominance samples on an even line in the 422 format, whereas, in the 420 format, it refers to chrominance samples on an add line, or vice versa. For interlaced pictures with frame prediction, such a change in line parity will cause temporal errors in a picture prediction at a decoding end. It will thus introduce distortion in decoded video data. The method illustrated in FIG. 6 prevents such distortion by adapting picture-prediction parameters, if necessary.

The method illustrated in FIG. 6 comprises various steps S1–S5 which are carried out, at least partially, for each macroblock of prediction-error samples R. The steps S1–S5 may lead either to a first end-result E1 or to a second end-result E2. The first end-result E1 is that the set of parameters PARo corresponds to the set of parameters PARi. This implies that the 422/420 conversion does not effect the prediction mode which may be frame or field. The second end-result E2 is that the set of parameters PARo only partially corresponds to the set of parameters PARi, because picture-prediction parameters are adapted. This parameter adaptation entails a change in prediction mode from frame to field. As a result, two separate predictions will be made at a decoding end: a top-field prediction for the top field, and a bottom-field prediction for the bottom field. Section 6.1.1.3 of the MPEG-2 standard defines the top field and the bottom field.

In step S1, the parameter processor PP checks whether the prediction mode PTi for a certain macroblock of prediction-error samples R is field FI or frame FR. If the prediction mode PTi is field FI, the first end-result E1 is obtained: the set of parameters PARo fully corresponds to the set of parameters PARi. If the prediction mode PTi is frame FR, further steps S2, S3 are carried out. It is noted that the prediction mode PTi is defined by the parameter frame_motion_type described in section 6.3.17.1 of the MPEG-2 standard.

In step S2, the controller calculates the vertical component Viy/HP of the motion vector for the macroblock of prediction-error samples R concerned. Section 7.6.3.1 of the MPEG-2 standard describes a method of calculating a motion vector and thus its vertical component. The vertical component Viy/HP of the motion vector thus calculated is expressed in half-pel units as prescribed in the MPEG-2 standard.

In step S3, the parameter processor PP checks whether the least significant bit of the motion vector's vertical component LSB(Viy/HP) is 1 or 0. If the motion vector's vertical component is 1, the first end-result E1 is obtained: the set of parameters PARo fully corresponds to the set of parameters PARi. If the motion vector's vertical component is 0, further steps S4, S5 are carried out.

In step S4, the parameter processor PP divides the motion vector's vertical component Viy/HP by two. Since the motion vector's vertical component Viy/HP is expressed in half-pel units, step S4 provides a binary value Viy/FP which is the motion vector's vertical component expressed in full-pel units. It is noted that dividing the motion vector's vertical component Viy/HP by two corresponds to deleting its least significant bit which is 0.

In step S5, the parameter processor PP checks whether a division by two of the motion vector's vertical component Viy/FP entails a change in parity. That is, the controller checks whether the outcome of the division by two is an even value, whereas the motion vector's vertical component Viy/FP is an odd value, or vice versa. If not (N), the first end-result E1 is obtained: the set of parameters PARo fully corresponds to the set of parameters PARi. If the division by two entails a change in parity (Y), the second end-result E2 is obtained: the set of parameters PARo only partially corresponds to the set of parameters PARi because some picture-prediction parameters are adapted.

FIG. 7 is a table illustrating the adaptation of motion-compensation parameters in the second end-result E2. As mentioned hereinbefore, the prediction mode is changed from frame FR to field FI: PTi=FR⇒PTo=FI. This implies that two separate predictions will be made at a decoding end: a top-field prediction for the top field and a bottom-field prediction for the bottom field. In the table, the column entitled TF lists parameter values which will be used for the top-field prediction and the column entitled BF lists parameter values which will be used for the bottom-field prediction. A parameter value which will be used for the top-field prediction has an index r=0, whereas a parameter value which will be used for the bottom-field prediction has an index r=1. Table 7.7 in section 7.6.3 of the MPEG-2 standard defines the index r and other indices which are used for picture-prediction parameters.

In the table illustrated in FIG. 7, the line entitled FSo specifies values for the parameter motion_vertical_field_select defined in section 6.3.17.3 of the MPEG-2 standard. For the top-field prediction, the value of this parameter is the modulo-two of the absolute value of the motion vector's vertical component Viy/FP in full-pel units. For the bottom-field prediction, the value of this parameter is one minus the modulo-two of the absolute value of the motion vector's vertical component Viy/FP in full-pel units.

The line entitled Voy/FP specifies, in full-pel units, values for the vertical components of a top-field motion vector and a bottom-field motion vector, respectively. The value, in full-pel units, for the vertical component of the top-field motion vector is the division by two, and rounding off to the nearest integer, of the following term: the original motion vector's vertical component Viy/FP, in full-pel units, minus the value of the parameter motion_vertical_field_select for the top-field prediction. In the table, the reference sign FSo_tf represents the latter value which is in the column TF on the line FSo. The value, in full-pel units, for the vertical component of the bottom-field motion vector is the division by two, and rounding off to the nearest integer, of the following term: one plus the motion vector's vertical component Viy/FP, in full-pel units, minus the value of the parameter motion_vertical_field_select for the bottom-field prediction. In the table, the reference sign FSo_bf represents the latter value which is on the line Fso in the column BF.

The line entitled Voy/HP specifies, in half-pel units, the values for the vertical component of a top-field motion vector and a bottom-field motion vector, respectively. For each vertical component, the value in half-pel units is twice the value in full-pel units listed on the line above. In the table, the reference sign Voy_tf/FP represents the value, in full-pel units, of the vertical component of the top-field motion vector. This value is on the line Voy/FP in the column TF. In the table, the reference sign Voy_bf/HP represents the value, in fullpel units, of the vertical component of the bottom-field motion vector. This value is on the line Voy/FP in the column BF.

The parameter processor PP illustrated in FIG. 4 establishes the following adapted motion-vector parameters: motion_code, motion_residual, and dmvector. Section 6.3.17.3 of the MPEG-2 standard describes these parameters. The adapted motion-vector parameters provide, at a decoding end, the top-field motion vector and the bottom-field motion vector having vertical components as specified in the columns TF and BF, respectively, on the line Voy/HP in the table shown in FIG. 7. The horizontal component of the top-field motion vector and that of the bottom-field motion vector correspond to the horizontal component of the motion vector comprised in the received MPEG-data stream DS.

The coding-error compensator CEC will now be discussed in greater detail. The coding-error compensator CEC subtracts a coding-error compensating macroblock of samples EC from a processed macroblock of prediction-error samples RP. Accordingly, a coding-error compensated processed macroblock of prediction-error samples RPC is obtained. The discrete-cosine transformer DCT individually transforms each block in the coding-error compensated processed macroblock of prediction-error samples RPC into a block of spatial-frequency coefficients. The quantizer Q quantizes each spatial-frequency coefficient in the block. As a result, a block of quantized spatial-frequency coefficients is obtained which is supplied to the variable-length encoder VLC. In response, the variable-length encoder VLC provides variable-length codes which are written into the output buffer OBUF and, after a certain time, are read from the output buffer OBUF so as to form part of the modified MPEG data stream MDS.

The coding-error compensator CEC establishes error-compensating macroblocks of samples EC in the following manner. For each coding-error compensated processed macroblock of prediction-error samples RPC, the inverse discrete cosine transformer IDCT2 preceded by the de-quantizer DQ2, provides a decoded version RPCD of the coding-error compensated processed macroblock of prediction-error samples RPC. The subtractor SUB1 subtracts the original coding-error compensated processed macroblock of prediction-error samples RPC from the decoded version RPCD thereof. As a result, a coding-error macroblock of samples E is obtained which is stored in the memory MEM. Thus, when the prediction-error encoder PEE receives a processed macroblock of prediction-error samples RP belonging to a picture P(n), the memory MEM will contain coding-error macroblocks of samples E belonging to the previous picture P(n−1). The motion compensator MC selects one of these coding-error macroblocks of samples E on the basis of the motion vector Vo associated with the processed macroblock of prediction-error samples RP. The coding-error macroblock of samples E which has been selected constitutes the error-compensating macroblock of samples EC.

As mentioned hereinbefore, the 422/420 format converter illustrated in FIG. 4, whose operation is further explained with reference to FIGS. 5–7, recaptures the features illustrated in FIG. 1. With regard to this, the following remarks are made. The method illustrated in FIG. 6 examines whether a satisfactory result will be obtained if the set of parameters PARi for decoding the coded video data received is applied for decoding the coded modified video data. If the result is satisfactory, the set of parameters PARi for decoding the coded video data received is added to the coded modified video data: PARo=PARi. If the result is not satisfactory, a new set of parameters is established and the new set of parameters is added to the coded modified video data. The new set of parameters is established by adapting one or more parameters which were originally established for the coded data.

The drawings and their description hereinbefore illustrate rather than limit the invention. It will be evident that there are numerous alternatives which fall within the scope of the appended claims. In this respect, the following closing remarks are made.

There are numerous ways of physically spreading functions or functional elements over various units. In this respect, the drawings are very diagrammatic, each representing only one possible embodiment of the invention. Thus, although a drawing shows different functional elements as different blocks, this by no means excludes that some functional elements, or all functional elements, may be implemented as a single physical unit.

Although the 422/420 format converter illustrated in FIG. 4 decodes the incoming MPEG-data stream only partially, this by no means excludes an embodiment in which coded data received is fully decoded. For example, the 422/420 format converter illustrated in FIG. 4 may be modified in the following manner. The prediction-error decoder PED is replaced by a decoder which fully decodes the MPEG-data stream so as to obtain macroblocks of picture samples including chrominance picture samples. The chrominance processor CP is replaced by a vertical filter which makes weighed combinations of the chrominance picture samples in the vertical dimension as illustrated in FIG. 3. Since the vertical filter operates on chrominance picture samples rather than on chrominance prediction-error samples, it is not necessary to check whether vertically neighboring macroblocks have similar motion vectors. That is, there is no need for a controller similar to the controller CON in the chrominance processor CP. The prediction-error encoder PEE is replaced by an encoder which codes the macroblocks of picture samples having been processed by the vertical filter. The encoder carries out a motion compensation which is based on the set of parameters PARo, in particular on the adapted picture-prediction parameters illustrated in FIG. 7.

What is claimed is:

1. A method of modifying coded data (CD) which is accompanied by a set of parameters (PAR) for decoding the coded data (CD), the method comprising the steps of:

decoding (DEC1), at least partially, the coded data (CD) so as to obtain decoded data (DD);

modifying (MOD) the decoded data (DD) so as to obtain modified data (MD);

coding (ENC2) the modified data (MD) so as to obtain coded modified data (CMD);

examining (EXAM) whether a satisfactory result will be obtained, if the set of parameters (PAR) for decoding the coded data (CD) is applied for decoding (DEC2) the coded modified data (CMD); and adding (ADD) to the coded modified data (CMD) the set of parameters (PAR) for decoding the coded data (CD) if the result is satisfactory or, if the result is not satisfactory, establishing (ADP) a new set of parameters (APAR) and adding (ADD) the new set of parameters (APAR) to the coded modified data (CMD).

2. A data modifier for modifying coded data (CD) which is accompanied by a set of parameters (PAR) for decoding (DEC1) the coded data (CD), the data modifier comprising:

a decoder (DEC1) for decoding, at least partially, the coded data (CD) so as to obtain decoded data (DD);

a modifier (MOD) for modifying the decoded data (DD) so as to obtain modified data (MD);

an encoder (ENC2) for coding the modified data (MD) so as to obtain coded modified data (CMD);

an examiner (EXAM) for examining whether a satisfactory result will be obtained if the set of parameters (PAR) for decoding the coded data (CD) is applied for decoding (DEC2) the coded modified data (CMD) and, if so, adding (ADD) to the coded modified data (CMD) the set of parameters (PAR) for decoding the coded data (CD) if the result is satisfactory or, if the result is not satisfactory, establishing (ADP) a new set of parameters (APAR) and adding (ADD) the new set if parameters (APAR) to the coded modified data (CMD).

* * * * *